June 2, 1931.  F. W. HILD  1,808,222
POWER TRANSMISSION SYSTEM
Original Filed March 22, 1921   2 Sheets-Sheet 2
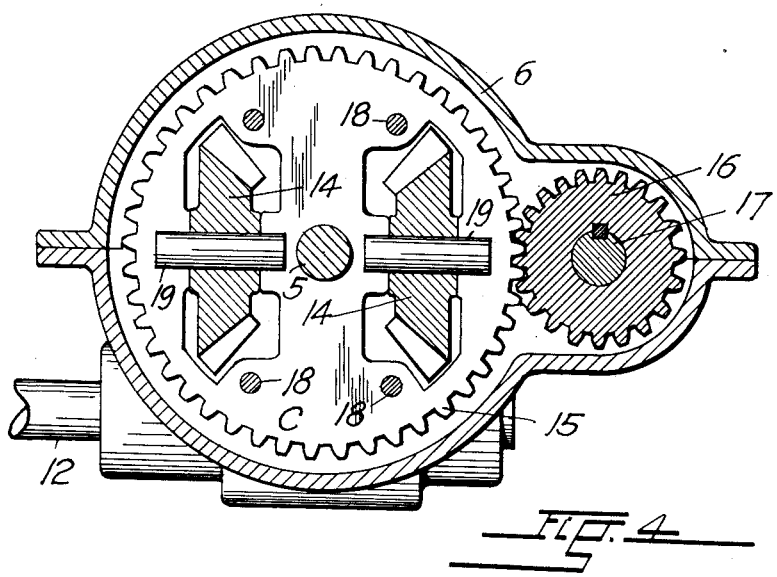
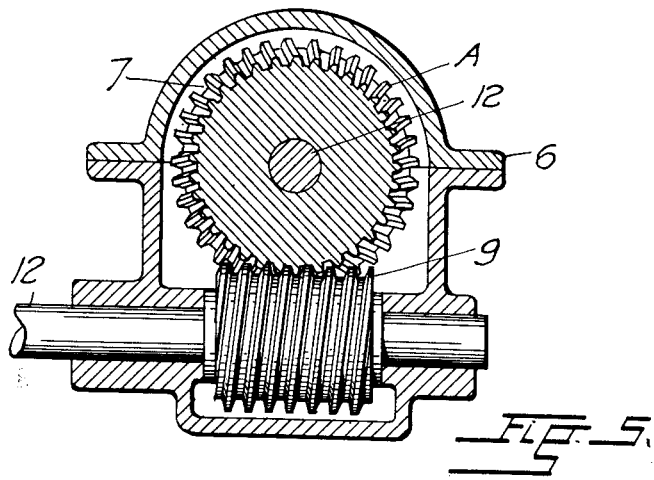
INVENTOR.
F. W. HILD.
BY
ATTORNEY.

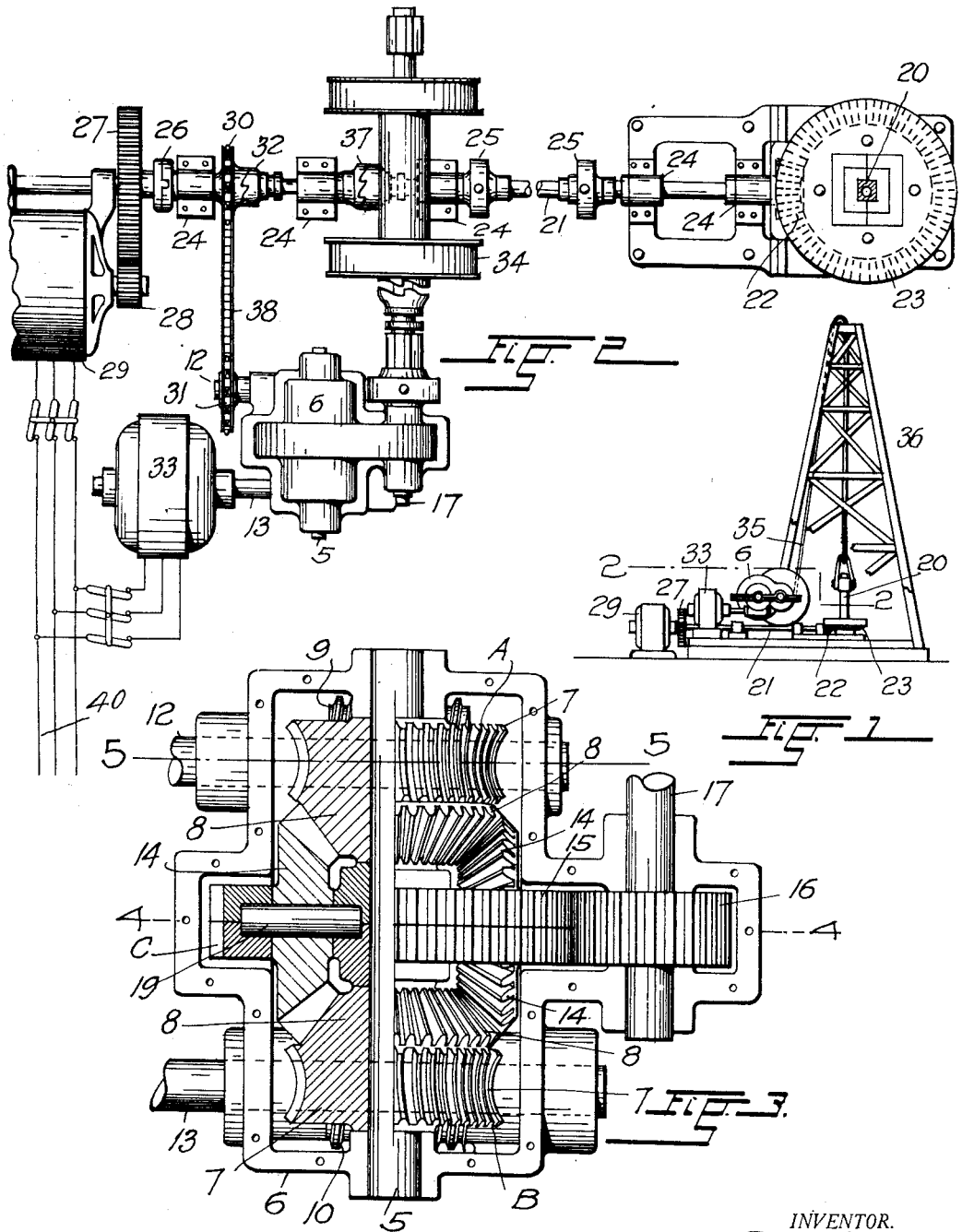

Patented June 2, 1931

1,808,222

UNITED STATES PATENT OFFICE

FREDERICK W. HILD, OF DENVER, COLORADO

POWER TRANSMISSION SYSTEM

Application filed March 22, 1921, Serial No. 454,451. Renewed May 7, 1924.

My invention relates to a system of power transmission, and its main object is to provide a system of cooperatively associated power producing and power transmitting devices in which the operation of a driven element is automatically regulated by and proportionate to variations in the relative velocities of two driving elements.

With this object in view, my invention consists, briefly, in providing for the operation of a driven machine element, a differential movement which has in operative relation to a driven member, two driving members which are separately connected with two motors or other independently operating sources of mechanical energy.

By varying the relative velocities of the two motors, the speed of the driven member of the differential movement is automatically controlled and when said driven member is operatively connected to a moving part of a mechanism and one of the motors is connected to another moving part of the same, the load variations of said motor due to changes in the physical resistance to the operation of the machine part with which it is associated, are instrumental in proportionately regulating the movement of the other part.

My invention thus provides a simple and efficient medium for the control of a driven member of different mechanisms, as for example, those used for the propulsion of ships and vehicles, or the operation of printing presses, machine tools, drilling machines and other appliances.

My system of power transmission as hereinafter to be described with reference to the accompanying drawings is particularly adapted for use in connection with drilling machines of the type used in boring wells, to automatically regulate the feed of a rotary drill tool in proportion to variations in its weight or in the resistance to its operative movement.

It will be evident that by the use of my invention any desired torque and any speed gradation may be obtained irrespective of the type of motors used and that in consequence it has an advantage of more than ordinary merit in that it permits of the employment of motors of limited speed variations under conditions which ordinarily render their use impractical and frequently prohibitive.

It is well known that excepting the series wound, variable-speed electirc motor, all other types of electric motors and all internal combustion engines have fundamentally constant speed characteristics and their torques vary with their speeds. Thus at low speeds which by special design or by the use of special auxiliary devices they may attain, the torque or pulling power is low. These limitations naturally narrow the field of application of constant speed motors. For example, in the industries subject to the ignition or explosion of inflammable gases, liquids or materials such as powder mills, flour mills, oil wells, gas wells, etc., only the A. C. induction motor may be safely used because of its freedom from exposed or moving contacts, but when speed and torque control become necessary then the use of these motors is limited or confined to such places where they may be isolated.

These objections are completely eliminated by the use of my invention which in addition to its advantages hereinbefore referred to, provides a simple and efficient means for obtaining full torque or any desired torque with any speed or any gradation of speed, smoothly and gradually from any type of motor. In the operation of my invention the speed can be made forward or backward through zero speed with full torque and without stopping or reversing the motors.

When applied to rotary drilling machines for gas and oil wells, my invention permits of the safe use of electric motors of any type on or close to the derrick-floor. This makes it possible to employ a straight line shaft drive free from chains and sprockets, direct to the rotary table, and thereby obtain an absolutely uniform flow of power.

In the accompanying drawings in the various views of which corresponding parts are designated by similar characters of reference—

Figure 1 is an outline elevation of a well-drilling machine to which my invention is applied;

Figure 2, a section taken on the line 2—2, Figure 1 drawn to an enlarged scale;

Figure 3, a composite view of the differtial mechanism of my invention showing the cooperating parts thereof partially in elevation and partially in section, a part of the sectional casing in which the mechanism is enclosed having been removed;

Figure 4, a section along the line 4—4, Figure 3, and

Figure 5, a section taken on the line 5—5, Figure 3.

Referring more specifically to the drawings, the differential movement in its preferred form comprises two driving members A and B mounted for rotation upon a relatively stationary shaft 5 which is supported in bearings at opposite ends of a sectional casing 6.

Each driving member consists of a wormwheel 7 and a beveled gear wheel 8 formed in integral connection for conjunctive rotation by the impellent action of a worm with which the worm wheel engages.

The worms which are designated by the reference characters 9 and 10 are mounted respectively upon shafts 12 and 13 which are rotatably supported in bearings at opposite sides of the housing and extend outside the same for their connection with the motive elements of the invention as will hereinafter be more fully described.

The beveled gear wheels of the driving members of the movement mesh with correspondingly formed planet gear-wheels 14 which are rotatably mounted on a gear wheel 15 which constitutes the driven member C of the movement.

The gear wheel 15 is rotatably supported on the before mentioned shaft 5 intermdiate of the driving members and the planet gear wheels are mounted in openings of the wheel to engage the beveled gear wheels of the driving members at opposite points.

The driven member of the mechanism imparts its movement to a part of the machine with which the differential movement is associated, through the medium of a pinion 16 on a shaft 17 which is mounted in bearings on the housing.

In the construction shown in the drawings, the driven gear wheel is composed of two complementary parts connected by bolts 18 and correspondingly recessed to provide bearings for the ends of the shafts 19 upon which the planet gears are mounted.

In the operation of the movement the worm shafts of the two driving members are as hereinbefore explained connected to two motive elements capable of effecting their independent rotation of different velocities.

It will be apparent that when the two driving members actuated by their respective motive elements rotate at equal velocities in opposite directions, their impellent actions upon the driven member through the medium of the planet gears, are balanced and the member is in consequence maintained in a condition of rest. If, however, the two driving members are rotated at different velocities, their unequal impellent actions upon the planet gears will cause the gearwheel 15 to move in the direction of the greater speed at a velocity equal to one-half of the difference between the velocities of said members, and its rotary motion imparted to the pinion 16 causes a corresponding movement of the moving part of the machine with which the latter is connected.

It will thus be understood that by the use of the differential movement as described, the operation of a part of a machine may be regulated by and proportionate to a variable difference in the relative movement of the two motive elements and that by causing the movement of one of said elements at a substantially constant speed and connecting the other of the elements to another part of the machine, the operation of the first-mentioned part is automatically controlled by the movement of the other.

An example of the application of my invention is illustrated in Figures 1 and 2 of the drawings in which the reference numeral 20 designates the rotary tool of a well drilling machine which receives its movement from a driving shaft 21 through the medium of a pair of beveled gear-wheels 22 and 23. The shaft is supported in bearings 24 and it is made in sections which are connected by flexible couplings 25 and provided with a clutch 37 to control the movement of one relative to another.

The shaft is connected at its end opposite to that which carries the driving gear wheel 22 with a gear-wheel 27 by means of a flexible coupling 26 of suitable construction, and the gear wheel meshes with a pinion 28 on the rotor of a motor 29 which constitutes one of the motive elements hereinbefore referred to.

The rotary movement of the shaft imparted thereto by the movement of the motor is transmitted to the worm-shaft of one of the driving members of the differential movment through the medium of a chain 38 and sprocket-wheels 30 and 31 one of which is connected to the shaft by means of an adjustable clutch 32.

The worm shaft of the other driving member of the movement connects with a rotary part of a second motor 33 which constitutes the other of the before-mentioned motive elements of the combination.

The shaft of the pinion 16 which meshes with the gear wheel 15 of the driven member C of the movement is connected with a winding drum 34 of a windlass which regulates the feed of the tool of the drilling machine by its connection with the pull rope 35 of a tackle by which the tool is suspended from a crown-block at the top of a derrick 36 shown in Figure 1 of the drawings.

In drilling machines of the above-described character as heretofore constructed, the feed of the drill tool is controlled by manipulation of a brake on the drum of the windlass, usually requiring the services of a skilled and experienced attendant who, guided by a highly developed sense of touch and hearing, operates the brake so as to regulate the movement of the drilling tool in accordance with changes in its weight by additional lengths of pipe, or variation in the resistance it encounters owing to the heterogeneous nature of the earth formations through which it is driven.

In the use of the present invention this result is automatically produced with dependable and unvarying accuracy through the medium of the differential movement and the therewith associated motive elements.

Premising that the motor 33 operates at a substantially constant velocity, it will be apparent that any variation in the velocity of the other motor caused by changes in its load will effect a corresponding movement of the winding drum and accordingly regulate the feeding movement of the drill tool.

The load variations of the motor are principally caused by changes in the weight of the tool, variation in the resistance it encounters, and breakage of parts and it will thus be seen that by the use of my invention many accidents and detrimental occurrences in the work of well drilling, mostly due to excessive stress on the drilling tool and its operating mechanism by improper regulation of its operative movement, are automatically avoided and that in consequence the operation of driving the well is greatly expedited and performed at a reduced expense of labor and material.

While the motors connected with the driving elements of the differential movement are preferably of the electric type to be actuated by a flow of current derived from a conveniently located source of electricity, such as supply circuit 40, I desire it understood that in the expression "motive element" in the foregoing description and the hereunto appended claims, is embraced any kind of machine or mechanism that produces or imparts mechanical power.

In the use of electric motors, one of them may "float" on the line or may run at higher speed than required, in which case it performs the function of a generator for the supply of current to the other motor, and thereby lessens the draft on the electric system.

Having thus described the improved differential system in the best and simplest form at present known to me, I desire it understood that variations in the construction and arrangement of its cooperating parts may be resorted to within the scope of my invention as defined in the hereunto appended claims.

What I claim and desire to secure by Letters-Patent is:

1. Earth-boring apparatus comprising a drill stem, means for freely suspending a portion of the weight of said drill stem, driven means for effecting rotation of said drill stem, and a plurality of motor devices and a differential mechanism for operating said means, one of said motor devices having a positive driving connection with said driven means.

2. Earth-boring apparatus comprising a cutting tool, a motor device positively connected to said tool to effect rotation thereof, means including a second motor device for partially and freely suspending the weight of said tool and affecting the feed thereof, and a differential device having one element directly connected to the first-named motor device, a second element directly connected to the second motor device and an intermediate element connected to said means.

3. Earth-boring apparatus comprising a differential device, a motor device connected to rotate a drill and also operatively connected to one element of said differential device in a manner tending to feed the drill in one direction, a second motor device connected to a second element of said differential device in a manner tending to feed the drill in the opposite direction, and means for controlling the feed of the drill connected to a third element of said device.

4. Earth-boring apparatus comprising a drill stem, means for suspending a portion of the weight of said drill stem, driven means for effecting rotation of said drill stem, a differential gear mechanism having three elements, a motor device interposed between one of said elements and said driven means, and a second motor device connected to a second element, the third element being connected to said suspending means, whereby variations in the relative speeds of said motor devices affect the degree of suspension of said drill stem.

5. In earth-boring apparatus, the combination with a suspended rotatable drill, of a plurality of motor devices for respectively effecting positive and indirect rotation of said drill and a differential mechanism operating jointly with said motor devices and the gravity force acting on said drill to control the degree and direction of longitudinal feed of the drill in response to the working resistance encountered to thereby vary the degree of suspension of the drill.

6. In earth-boring apparatus, the combination with a drill stem and driven means for effecting rotation thereof, of means for suspending a portion of the weight of the drill stem and tending to operate the same substantially vertically irrespective of the force of gravity, a differential gear mechanism having one element connected to said suspending means, and a plurality of motor devices respectively connected to two other elements of said mechanism.

7. In a drilling system, in combination, a drill biased to advance to its work, a motor for operating the drill, a mechanism for exerting a force in opposition to the biasing force, a differential device for operating said mechanism, a second motor for exerting torque on the differential device to increase the opposing force exerted by said mechanism, and means for connecting the drilling motor to the differential device to operate it in such manner as to reduce the opposing force upon an increase in the speed of the drilling motor above a predetermined limit.

8. In a drilling machine, a gravity-operable drill tool, a motor operatively connected thereto, a hoisting mechanism connected to restrain the action of gravity upon, and so control, the feed of the tool, a second motor, and a differential movement having a driven member operatively connected to said mechanism, and two driving members which are seperately connected to said motors.

In testimony whereof I have affixed my signature.

FREDERICK W. HILD.